(12) United States Patent
Bennett et al.

(10) Patent No.: US 8,364,024 B2
(45) Date of Patent: Jan. 29, 2013

(54) CONSTRUCTING VIDEO FRAMES AND SYNCHRONIZING AUDIO DATA IN A MEDIA PLAYER FROM DATA RECEIVED VIA A PLURALITY OF DIVERSE PROTOCOL STACK PATHS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1032 days.

(21) Appl. No.: 12/365,060

(22) Filed: Feb. 3, 2009

(65) Prior Publication Data
US 2010/0195977 A1 Aug. 5, 2010

(51) Int. Cl.
*H04N 5/917* (2006.01)
(52) U.S. Cl. ....................................................... 386/328
(58) Field of Classification Search .................. None
See application file for complete search history.

(56) References Cited

U.S. PATENT DOCUMENTS

| | | | | |
|---|---|---|---|---|
| 4,040,088 | A * | 8/1977 | Hannan | 386/204 |
| 6,104,441 | A * | 8/2000 | Wee et al. | 375/240.15 |
| 2001/0008577 | A1 * | 7/2001 | Yamada et al. | 386/98 |
| 2002/0164024 | A1 * | 11/2002 | Arakawa et al. | 380/210 |
| 2005/0175085 | A1 * | 8/2005 | Bergen et al. | 375/240.01 |
| 2006/0143667 | A1 * | 6/2006 | Kurosawa | 725/89 |
| 2006/0248216 | A1 * | 11/2006 | Park | 709/231 |
| 2007/0242080 | A1 * | 10/2007 | Hamada et al. | 345/606 |
| 2008/0198921 | A1 | 8/2008 | Kim | |

FOREIGN PATENT DOCUMENTS
EP 2012538 A1 1/2009

OTHER PUBLICATIONS
European Patent Office, Communication with European Search Report dated May 25, 2010, in Application No. 10000714.5.
Chen, "An Error Concealment Algorithm for Entire Frame Loss in Video Transmission", 24. Picture coding Symposium; San Francisco, Dec. 15, 2004, XP030080169.

* cited by examiner

*Primary Examiner* — Huy T Nguyen
(74) *Attorney, Agent, or Firm* — Brinks Hofer Gilson & Lione

(57) ABSTRACT

Video frames from a sequence of video frames and corresponding audio are received and processed by a media player. A first portion of the sequence depends on fewer reference frames then a second portion of the sequence. The number of reference frames per frame is limited. The first and second portions of the sequence are treated differently. The first portion is received at a lower data rate, with greater security and processed with a more robust protocol stack than the second portion. The first and second portions may be stored in a single queue and/or separate queues. The first portion of frame data is utilized to compensate for lost frames by repeating and/or interpolating video frames. The media player constructs a local video frame and synchronizes corresponding audio content with it. The received, repeated and/or interpolated video frames are assembled into display order and decoded.

26 Claims, 8 Drawing Sheets

US 8,364,024 B2

CONSTRUCTING VIDEO FRAMES AND SYNCHRONIZING AUDIO DATA IN A MEDIA PLAYER FROM DATA RECEIVED VIA A PLURALITY OF DIVERSE PROTOCOL STACK PATHS

CROSS-REFERENCE TO RELATED APPLICATIONS/INCORPORATION BY REFERENCE

This patent application makes reference to U.S. patent application Ser. No. 12/365,045 filed on even date herewith.

The above stated application is hereby incorporated herein by reference in its entirety.

FIELD OF THE INVENTION

Certain embodiments of the invention relate to communication systems. More specifically, certain embodiments of the invention relate to a method and system for constructing video frames and synchronizing audio data in a media player from data received via a plurality of diverse protocol stack paths.

BACKGROUND OF THE INVENTION

For many people, multimedia communication technology has become a part of everyday life. Multimedia technology is found in many popular portable or stationary devices, for example, mobile phones, digital handheld audio and/or video playback devices, laptops, personal computers, televisions, projection equipment, video and still camera displays, electronic gaming, set top box, medical and scientific equipment and home or commercial entertainment centers. Multimedia communication and playback devices have become prevalent in the market due to the low cost of communications technology and ever increasing customer demand for more advanced multimedia systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for constructing video frames and synchronizing audio data in a media player from data received via a plurality of diverse protocol stack paths, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for constructing video frames and synchronizing audio data in a media player from data received via a plurality of diverse protocol stack paths. A media player receives a sequence of video frames and corresponding audio content from a media source. The media player processes a first portion of the received sequence of video frames via a first protocol stack and a second portion of the received sequence of video frames via a second protocol stack. The media player generates a local sequence of video frames from the processed first portion of the received sequence of video frames and the processed second portion of the received sequence of video frames. The first portion of the received sequence of video frames is received via a first communication path with a lower data rate. The second portion of the received sequence of video frames is received via a second communication path at a higher data rate. In various embodiments of the invention, the first portion of the received sequence of video frames comprises video frames with fewer frame reference dependencies than the second portion of the received sequence of video frames. In this regard, the media source is operable to limit the number of allowed dependencies per frame when encoding frames in the sequence of video frames. The first portion of the received sequence of video frames that comprise fewer frame reference dependencies are received in the media player with a higher level of security and are treated with a more robust process than the second portion of the sequence of video frames with a greater number of frame reference dependencies.

In various embodiments of the invention, the media player stores video frame data from the first portion and the second portion of the received sequence of video frames in separate pathway queues. In other embodiments of the invention, the media player stores the video frame data from the first and second portions of the received sequence of video frames in a single pathway queue. Video frame data from the first portion of the received sequence of video frames is utilized to compensate for lost video frames by generating repeated video frames and/or interpolated video frames. The media player constructs the local sequence of video frames that comprise the received video frames, repeated video frames and/or interpolated video frames. The media player synchronizes and/or audio shifts the audio content and the generated local sequence of video frames. Furthermore, the media player decodes the local sequence of video frames and audio content. In this manner, the media player selectively processes the received video frames according to their ability to improve frame reconstruction and/or audio synchronization.

Figure 1:
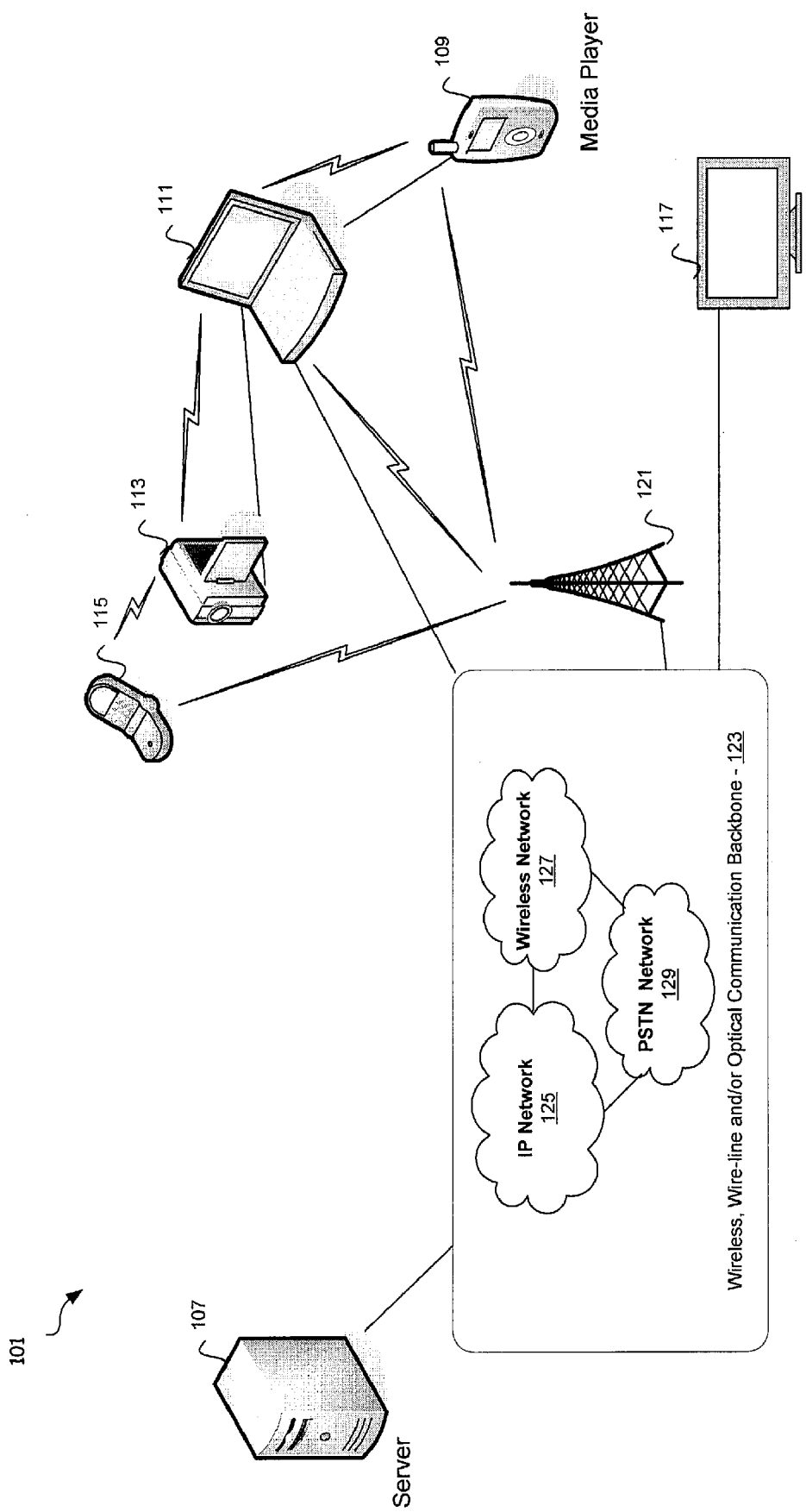
FIG. 1 is a block diagram illustrating an exemplary communication system comprising one or more media players, in accordance with an embodiment of the invention.

FIG. 1 is a block diagram illustrating an exemplary communication system comprising one or more media players, in accordance with an embodiment of the invention. Referring to FIG. 1, there is shown, a communication system 101 comprising a media sourcing server 107, a communication backbone 123, an IP network 125, a wireless network 127, a public telephone network (PSTN) 129, a wireless base station 121, a wireless communication device 115, a video camera 113, a laptop 111, a media player 109 and a television system 117.

The media sourcing server 107 comprises suitable logic, circuitry and/or code that are operable to store multimedia data and/or deliver multimedia data to one of more media players and/or storage devices. In addition, the media sourcing server 107 is operable to capture multimedia data, for example, with a camera and/or microphone and/or process and store the multimedia data. The media sourcing server 107 is operable to encode and/or decode video frames that have a limited number of reference frame dependencies. In this regard, the video frame depends on a reference frame for data that enables estimation of the video frame in a media player. The sourcing server 107 is operable to selectively packetize and communicate multimedia data to the media player 109 and/or other devices comprising media players such as the wireless communication device 115, the video camera 113, the laptop 111 and the television system 117. The multimedia data comprises audio and/or video data. The media sourcing server 107 is operable to assign varying levels of priority to selected multimedia packet data and communicates the multimedia packet data via a plurality of packet delivery methods based on the assigned priority. The media sourcing server 107 is operable to communicate with the media player 109 and/or the other devices comprising media players via one or more wireless, optical and/or wire-line communication networks. For example, the media sourcing server 107 is operable to communicate with the media player 109 and/or the other devices via the communication backbone 123, IP network 125, wireless network 127, PSTN 129, the wireless base station 121 and/or a Bluetooth connection. The invention is not limited to any specific type of media sourcing server 107 and any suitable computing and/or communication device that is capable of handling multimedia data may be utilized. Exemplary embodiments of the media sourcing server 107 comprise a video server, a telephone, a web site streaming a live broadcast video channel, video on demand, multicast or unicast, and a personal computer (PC). In this regard, a PC is operable to play a video from, for example, a DVD or Blu-ray disc and transmit corresponding multimedia via the Internet to a media player.

The media player 109 comprises suitable logic circuitry and/or code that are operable to receive, process and/or store multimedia data, for example, video data, still data and/or audio data. The multimedia data is received via a wireless, wire-line or optical communication path from another device or is retrieved from a media storage device or disc for example. In addition, the media player 109 is operable to process the received multimedia data that is packetized and received via diverse plurality of communication protocol paths. In this regard, the media player 109 is operable to selectively process received multimedia data packets within a plurality of protocol stack paths. Also, the media player 109 is operable to restore and/or generate video frames based on frame repetition or interpolation, assemble video frames into display order and/or synchronize the video frames with received audio data. Moreover, the media player 109 is operable to decode the received audio and video frames that are encoded having a limited number of reference frame dependencies. The media player 109 is operable to render multimedia content via an integrated and/or external video display and/or audio speakers. Furthermore, the media player 109 comprises a media player chip or chipset that comprises suitable logic, circuitry and/or code to handle the received and/or retrieved multimedia data. The media player 109 is communicatively coupled to one or more of the wireless communication device 115, the video camera 113, the laptop 111, the media sourcing server 107 and the television system 117 via one or more of the communication backbone 123, the IP network 125, the wireless network 127, the PSTN 129, the wireless base station 121 and/or the Bluetooth connection.

The laptop 111 comprises suitable logic circuitry and/or code that are operable to receive, process and/or store multimedia data, for example, video data, still data and/or audio data. In this regard, the laptop 111 is operable to encode and/or decode audio data and/or video frames that have a limited number of reference frame dependencies. The multimedia data is received via a wireless, wire-line or optical communication path from another device or is retrieved from a media storage device or disc for example. In addition, the laptop 111 is operable to process the received multimedia data that is received via a plurality of diverse communication protocols paths. In this regard, the laptop 111 is operable to selectively process received multimedia data packets within a plurality of protocol stack paths and to restore, assemble and/or audio sync received video frames from the received packets. The laptop 111 is operable to render multimedia content via an integrated and/or external video display and/or audio speakers. Furthermore, the laptop 111 comprises a general purpose processor and/or code that are operable to implement media player functionality. In addition, the laptop 111 comprises special purpose hardware, software and/or firmware that is operable to implement a portion of the media player functionality.

In various embodiments of the invention, the laptop 111 comprises a media player chip or chipset that comprises suitable logic, circuitry and/or code that is operable to processing of the received and/or retrieved multimedia data. The laptop 111 is communicatively coupled to one or more of the wireless the media player 109, communication device 115, the video camera 113, the media sourcing server 107 and the television system 117 via one or more of the communication backbone 123, the IP network 125, the wireless network 127, the PSTN 129, the wireless base station 121 and/or the Bluetooth connection. In various embodiments of the invention, the laptop 111 comprises suitable logic, circuitry and/or code that are operable to implement functionality of the sourcing server 107. Instead of the laptop 111, any suitable computing device such as a personal computer and/or handheld computing device may be utilized.

The wireless communication device 115 comprises suitable logic circuitry and/or code to receive and/or send voice and/or data comprising multimedia data via one or more of the communication backbone 123, IP network 125, wireless network 127, PSTN 129, the wireless base station 121 and/or a Bluetooth connection. The wireless communication device 115 communicates via one or more technologies comprising 3GPP, 3GPP2, LTE, WIMAX, WiFi, WLAN, and Bluetooth, as well as cordless phone standards such as DECT and/or PHS for example. Exemplary embodiments of the wireless communication device 115 are a mobile phone, a computing device, a cabled or wireless headset, a game device and/or a geo-location device.

The wireless communication device 115 comprises media player functionality which is handled by one or more of a chipset comprising one or more chips, a general purpose processor, software, firmware and/or special purpose hardware. The wireless communication device 115 is operable to receive and process the multimedia data via a plurality of diverse communication protocols paths. For example, the wireless communication device 115 is operable to process multimedia data based on TCP/IP and/or UDP transport layer protocols and/or based on Internet paths utilizing IPsec, IPv4 and/or IPv6 protocols. In this regard, the wireless communication device 115 is operable to selectively process received multimedia data packets within a plurality of protocol stack paths and to restore, assemble and/or audio sync received video frames from the received multimedia packets. In addition, the wireless communication device 115 is operable to encode and/or decode video frames that have a limited number of reference frame dependencies. The wireless communication device 115 is operable to render multimedia content via an integrated and/or external video display and/or audio speakers.

The video camera 113 comprises suitable logic, circuitry and/or code that are operable to capture, store, render and/or communicate multimedia data that is handled by a plurality of communication protocol stack paths. The video camera 113 is operable to send or receive multimedia data via a plurality of diverse communication protocol stack paths. In this regard, the video camera 113 is operable to selectively process multimedia data packets within a plurality of protocol stack paths. The video camera 113 is operable to restore and/or generate video frames, assemble video frames in display order and/or synchronize received audio data and video frames. In addition, the video camera 113 is operable to encode and/or decode video frames that have a limited number of reference frame dependencies. The video camera 113 is operable to render multimedia content via an integrated and/or external video display and/or audio speakers. The video camera 113 is communicatively coupled to one or more of the media player 109, wireless communication device 115, the laptop 111, the media sourcing server 107 and the television system 117 via one or more of the communication backbone 123, IP network 125, wireless network 127, PSTN 129, the wireless base station 121 and/or a Bluetooth connection.

The television system 117 comprises suitable logic, circuitry and/or code that are operable to receive, store, render and/or communicate multimedia data that is handled by a plurality of diverse communication protocol stack paths. The television system 117 is operable to receive the multimedia data comprising prioritized video frame data and/or audio data via a plurality of diverse communication protocols paths. In this regard, the television system 117 is operable to selectively process multimedia data packets within a plurality of protocol stack paths and to restore and/or generate video frames, assemble video frames into display order and/or synchronize the received audio data and video frames. In addition, the television system 117 is operable to encode and/or decode video frames that have a limited number of reference frame dependencies. The television system 117 is operable to render multimedia content via an integrated and/or external video display and/or audio speakers. The television system 117 is communicatively coupled to one or more of the media player 109, wireless communication device 115, the laptop 111, the media sourcing server 107 and the television system 117 and video camera 113 via one or more of the communication backbone 123, IP network 125, wireless network 127, PSTN 129, the wireless base station 121 and/or a Bluetooth connection.

The communication backbone 123 comprises suitable logic circuitry and/or code that enable wireless, wire-line and/or optical communication between a plurality of devices, networks and/or sub-networks. The communication backbone comprises one or more of the IP network 125, wireless network 127, PSTN 129 and wireless base station 121. In this regard, the communication backbone 123 and/or the base station 121 handles communication among the media player 109, wireless communication device 115, the laptop 111, the media sourcing server 107 and the television system 117 and/or video camera 113.

The base station 121 comprises suitable logic circuitry and/or code that is operable to handle wireless communication of multimedia data between the media sourcing server 107, the media player 109, the wireless communication device 115, the laptop 111, the television system 117 and the video camera 113. The base station 121 is an indoor or outdoor base station. In this regard, the base station 121 comprises, for example, a cellular base station, access point or cordless device docking station that is operable to support any suitable wireless and/or wire-line technology such as 3GPP, 3GPP2, WIMAX, LTE, WLAN, WiFi, Bluetooth and/or DECT.

In operation, the media sourcing server 107 captures or retrieves stored multimedia data. The multimedia data comprises audio data and/or video frames for one or more sequences of video frames. The sourcing server 107 encodes the video frames in a manner such that the number of reference frames depended on per video frame is limited. In various embodiments of the invention, the number of reference frame dependencies is limited to zero or one, for example. The video frames are sorted and/or prioritized according to the number of frame dependencies per video frame. In this regard, the higher priority frames comprise zero or fewer reference frame dependencies and are handled via a more robust protocol stack pathway.

Packets comprising the video frames are sent according to priority with varying reliability, quality of service and/or security, to one or more of the media player 109, the wireless communication device 115, the laptop 111, the television system 117 and/or video camera 113 that comprise media player functionality. Upon receiving the audio and/or video packets, the media player 109 or other device comprising the media player functionality selectively processes the received multimedia data packets within a plurality of diverse protocol stack paths accordingly. In addition, the received video frames are restored and/or utilized to generate missing video frames. The restored and/or generated video frames are assembled into display order and synchronized with corresponding received audio data. The multimedia data is decoded and consumed or is encoded and stored.

Figure 2:
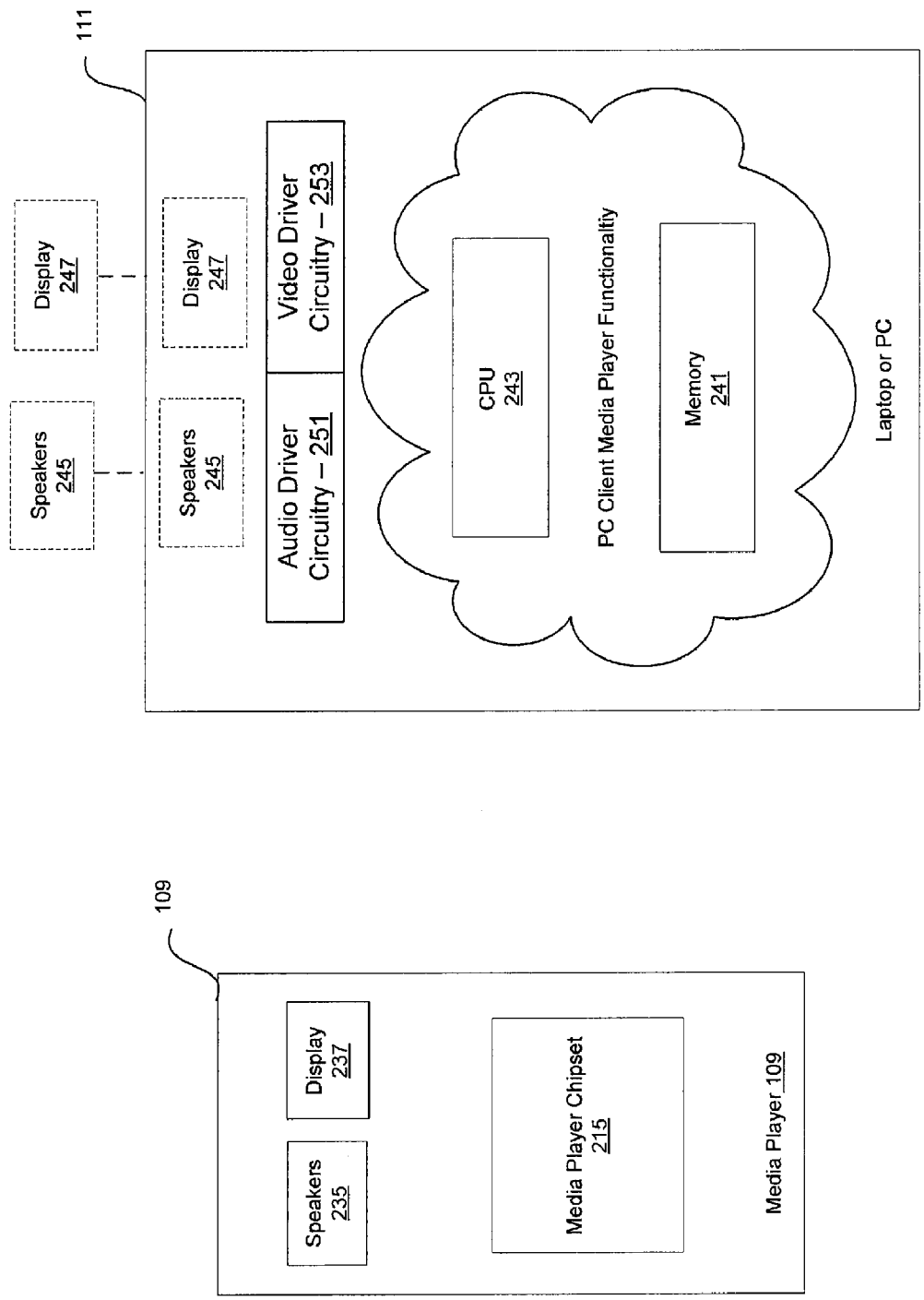
FIG. 2 is a block diagram illustrating exemplary media player functionality, in accordance with an embodiment of the invention.

FIG. 2 is a block diagram illustrating exemplary media player functionality, in accordance with an embodiment of the invention. Referring to FIG. 2, there is shown the media player 109, a media player chipset 215, speakers 235 and a display 237, the laptop 111, a general purpose processor 243, a memory 241, an audio driver 251, a video driver 253 and integrated or external speakers 245 and display 247.

The media player 109 is similar or substantially the same as the media player 109 described with respect to FIG. 1. The media player 109 comprises a media player chip or chipset 215 that implements the media player functionality described with respect to the media player 109 shown in FIG. 1. In operation, the chipset 215 receives multimedia data from the server 107, processes the multimedia data and sends decoded video data and audio data to the speakers 235 and display 237 respectively.

The laptop 111 is similar and/or substantially the same as the laptop 111 described with respect to FIG. 1. The laptop 111 comprises the memory 241 and the general purpose processor 243. The general purpose processor 243 and memory 241 are operable to implement media player functionality described with respect to the laptop 111 shown in FIG. 1. In operation, the general purpose processor 243 and memory 241 receive multimedia data from the server 107. Software that is stored within the memory 241 and run on the general purpose processor 243 is operable to process the received multimedia data and send corresponding decoded video data and audio data to the speakers 245 and display 277 via the audio driver 251 and video driver 253 respectively.

In various embodiments of the invention, media player functionality is implemented with various media player tasks allocated over hardware, firmware and/or software according to design choices. In various embodiments, such as the media player 109, media player functionality is handled by a chipset comprising one or more chips while in other embodiments such as the laptop 111, a general purpose processor is operable to handle the media player functionality. In addition, various embodiments of the invention, the media player functionality is distributed among a combination of a media player chipset, firmware, specialized processors, general purpose processors and/or memory.

Figure 3:
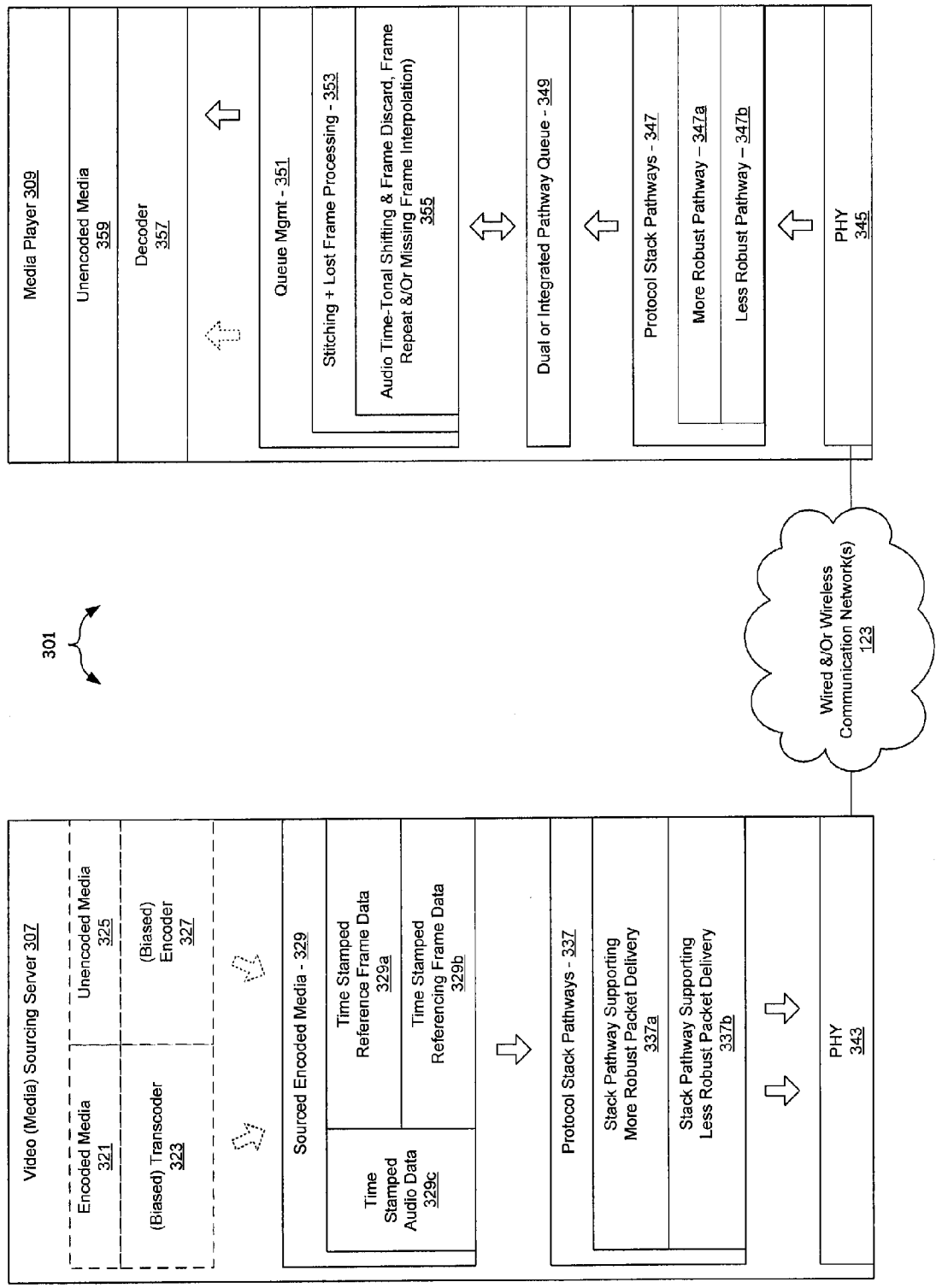
FIG. 3 is a block diagram illustrating an exemplary media sourcing server and media player for selective methods of processing and delivery of multimedia data, in accordance with an embodiment of the invention.

FIG. 3 is a block diagram illustrating an exemplary media sourcing server and media player for selective methods of processing and delivery of multimedia data, in accordance with an embodiment of the invention. Referring to FIG. 3, there is shown a multimedia communication system 301, a media sourcing server 307, encoded media 321, biased transcoder 323, unencoded media 325, biased encoder 327, source encoded media 329, time stamped non-referencing frame data 329a, time stamped referencing frame data 329b, protocol stack paths 337, stack pathway supporting more robust packet delivery 337a, stack pathway supporting less robust packet delivery 337b, physical interface (PHY) 343, a wired and/or wireless communication networks 123, media player 309, PHY 345, protocol stack paths 347, more robust pathway 347a, less robust pathway 347b, dual or integrated pathway queue 349, queue management 351, stitching and lost frame processing 353, video image restoration and audio sync 355, decoder 357 and unencoded media 359.

The media sourcing server 307 comprises suitable logic, circuitry and/or code that are operable to store, retrieve and/or capture multimedia data and selectively communicate the multimedia data to the media player 309. The media sourcing server 307 is similar or substantially the same as the media sourcing server 107 described with respect to FIG. 1. In this regard the multimedia data comprises text, still images, audio and/or video data. The media sourcing server 307 is operable to assign priority to multimedia packet data and communicates the multimedia packet data via a plurality of packet delivery methods based on the assigned priority. The media sourcing server 307 is operable to communicate with the media player 309 via one or more wireless and/or wired communication networks. The sourcing server 307 may be any suitable computing and/or communication device that is capable of handling multimedia data, for example, a video server, a telephone, a web site streaming a live broadcast video channel, video on demand multicast or unicast or a personal computer (PC) playing video from, for example, a DVD or Blu-ray disc and transmitting it via the Internet to a client device such as the media player 309.

The encoded media 321 comprises video and/or audio data that is compressed and/or encrypted to a specified format, for example, according to a standardized method of compression such as MPEG-1, MPEG-2, MPEG-4 or H.264. The encoded media may have been received from another device or a storage medium such as a DVD or Blu-ray disc, or is captured and encoded by the video sourcing server 307. The encoded media 321 is stored on the video sourcing server 307.

The biased transcoder 323 comprises suitable logic, circuitry and/or code that are operable to decode the encoded media 321, apply a bias to the decoded video frames and encode the video frames. Please note, throughout this document, the words frame and picture are used interchangeably to represent a video frame, field, macro-block or slice that comprises image data for a particular instant in time. In this regard, for each target frame in a sequence of video frames, the biased transcoder 323 is operable to identify the number of frames that it depends on for frame estimation information. In this regard, frame estimation utilizes video image pixel data from a reference frame along with information about how some elements of the reference frame change to form another similar frame. Exemplary frame estimation methods comprise frame repetition, motion vector interpolation and/or various image transformations such as for changes in hue, chroma and luminance. In various embodiments of the invention, the video frames are biased by reducing the number of frame dependencies, for example, to zero or one. In this regard, a portion of the frames in a sequence of video frames does not reference any other frames but is a reference for other frames. In addition, the biased transcoder 323 prioritizes the frames in a sequence of video frames according to the number of other frames it references. After the frames are sorted and prioritized, the biased transcoder encodes the frames according to the method utilized for the original encoded media 321 or it encodes the frames according to another method. Also, after the frames are sorted, prioritized and compressed, the compression ratio of the biased frame data is worse than the compression ratio of the original encoded media 321 because of the reduced use of frame referencing.

The unencoded media 325 comprises video and/or audio data that is not compressed. The unencoded media 325 is captured by the video sourcing server 307 and encoded. For example, the unencoded media 325 is captured by a video camera on the sourcing server 307 or is received from another device or a storage medium. The unencoded media 321 is stored on the video sourcing server 307.

The biased encoder 327 comprises suitable logic, circuitry and/or code that are operable to encode the unencoded media 325 and apply a bias to the video frames. In this regard, for each target frame in a sequence of video frames, the biased encoder 327 is operable to identify the number of frames that the target frame depends on for frame estimation purposes. For example, estimation of a target frame depends on a reference frame as a basis for frame repetition, for predicting motion or for various image transformations. In various embodiments of the invention, the frames are biased by limiting the number of frame dependencies to zero or one for example. A portion of the frames in a sequence of video frames does not reference any other frames. Other frames reference one other frame for example. In addition, the biased encoder 327 prioritizes each of the frames in the sequence of video frames according to the number of other frames that it references. After the frames are sorted and prioritized, the biased encoder encodes the frames according to a specified method. In general, the compression ratio of biased encoded frame data is less than unbiased encoded data because the number of a lower number of dependencies per frame.

The source encoded media 329 is exemplary frame data that is output from the biased transcoder 323 and/or the biased encoder 327. The source encoded media 329 comprises time stamped audio data 329c, time stamped non-referencing frame data 329a and/or time stamped referencing frame data 329b. In this regard, the non-referencing frame data 329a comprises video frames that do not depend on other frames for estimation of the non-referencing frame's image. The referencing frame data 329b comprises frame data that references other frames for estimation of a video image. The time stamping of audio data 329c, and video frames 329a and 329b enables sorting and syncing of audio and images on the media player 309. In various embodiments of the invention, the time stamped non-referencing frames 329a and the time stamped referencing frames 329b are sorted and/or prioritized, for example, according to a specified number of frames that are referenced per frame for frame estimation information. In this regard, frames that reference fewer other frames, for example, zero or one frames, are delivered to the media player 309 via a different pathway than frames that depend on a greater number of frames.

The protocol stack paths 337 comprise suitable logic, circuitry and/or code that are operable to implement various communication protocols with varying levels of security and/or robustness. In this regard, the protocol stack paths 337 utilize a suite of protocols to format the source encoded media 329 in accordance with the OSI model of hierarchical layers, for example, the transport layer, network layer, data link layer and physical layer. In various embodiments of the invention, the stack pathway supporting more robust packet delivery 337a is utilized to format the higher priority frame data from the source encoded media 329 and deliver it to a specified range of port numbers dedicated to reliable and/or secure delivery, for example, via transmission control protocol (TCP). In this regard, TCP guarantees properly ordered delivery of at least the non-referencing frames. Although TCP delivery is not as fast as some other transport layer protocols, only a portion of the frames are sent via this method. The lower priority frames are sent via the stack pathway supporting less robust packet delivery 337b. In this regard, the stack pathway supporting less robust packet delivery 337b delivers packets comprising lower priority video frames via a range of port numbers for a faster but less reliable delivery, for example, user datagram protocol (UDP). In addition, for packet deliver, a higher level of external quality of service (QoS) is assigned to packets that are assigned a higher priority.

The physical interface (PHY) 343 is a single PHY interface that comprises suitable logic, circuitry and/or code that is operable to physically transmit the packets comprising the source encoded media 329 from the protocol stack paths 337 to the media player 309 via the wired and/or wireless communication network 123. In addition, the PHY 345 comprises suitable logic, circuitry and/or code that is operable to receive the source encoded media from the PHY 343 via the wired and/or wireless network 123. The wireless and/or wired communication network 123 comprises one or more networks that are operable to transport multimedia data. For example, the wired and/or wireless networks comprise a Bluetooth connection or one of more of the communication backbone 123, the IP network 125, the wireless network 127, the PSTN 129 and the wireless base station 121 described with respect to FIG. 1.

The media player 309 comprises suitable logic, circuitry and/or code that are operable to receive, store, and/or render multimedia data that is communicated to the media player 309 from a remote source via diverse communication protocol paths. The media player 309 is similar or substantially the same as the media player 109 described with respect to FIG. 1. The multimedia data comprises text, audio, still image and/or video data. The media player 309 comprises one or more of a media player chipset, firmware, general purpose processor, special purpose processor and/or software that are operable to receive and process multimedia packet data that is delivered via a plurality methods based on an assigned priority. The media player 309 is operable to communicate with the sourcing server 307 via one or more wireless, optical and/or wired communication networks, for example, the communication backbone 123, the IP network 125, the wireless network 127, the PSTN 129, the wireless base station 121 and/or a Bluetooth connection described with respect to FIG. 1. The media player 309 is embodied in any suitable computing and/or communication device that is operable to handle multimedia data, for example, the wireless communication device 115, video camera 113, the laptop 111, the media player 109 and the television system 117.

The physical interface (PHY) 345 is a single PHY interface that comprises suitable logic, circuitry and/or code that are operable to physically receive packets comprising the source encoded media 329 from the PHY 343 in the sourcing server 307 via the communication backbone 123, the IP network 125, the wireless network 127, the PSTN 129, the wireless base station 121 and/or a Bluetooth connection.

The protocol stack paths 347 comprise suitable logic, circuitry and/or code that are operable to receive the packets comprising the source encoded media 329 via the more robust pathway 347a and/or the less robust pathway 347b from the single PHY 345. The protocol stack paths remove the encapsulation of the link layer, transport layer and/or Internet protocols. In addition, the protocol stack pathway 347 delivers the source encoded media to the dual or integrated pathway queue 349.

The queue management 351 comprises suitable logic, circuitry and/or code that is operable to receive the source encoded media 329 frames from the dual or integrated pathway queue 349 and restore images in the video frames and synchronize the audio and video frames. The video restoration and audio sync module 355 compensates for missing video frames in various ways. In an exemplary embodiment of the invention, the video restoration and audio sync 355 module repeats a frame if a prior or a subsequent frame is missing. In this manner, the audio stay in sync with the video images. In instances when up to about eight frames are missing, the missing frames are replaced with interpolated frames and the audio stays in sync with the interpolated frames. In other instances when more than about eight frames are missing, the frames are discarded and the audio play back rate is increased to catch up over some number of frames to the video frames to achieve synchronous audio and video images. In this regard, the increased audio rate causes a temporary tonal shift until the video and audio sync is achieved. In addition, the stitching and lost frame processing 353 receives the restored and synced frames and reassembles them into the proper sequence according to the time stamps. The queue management 351 forwards the reassembled frames comprising the source encoded media 329 to the decoder 357.

The decoder 357 comprises suitable logic, circuitry and/or code that are operable to decode the biased video frames. In various embodiments of the invention, the decoded frames are encoded without a bias for storage on the media player 309. In this regard the removal of the biasing improves the compression ratio for more compact storage. In other embodiments of the invention, the decoder 357 outputs the unencoded media 359 for consumption by the media player 309.

Figure 4:
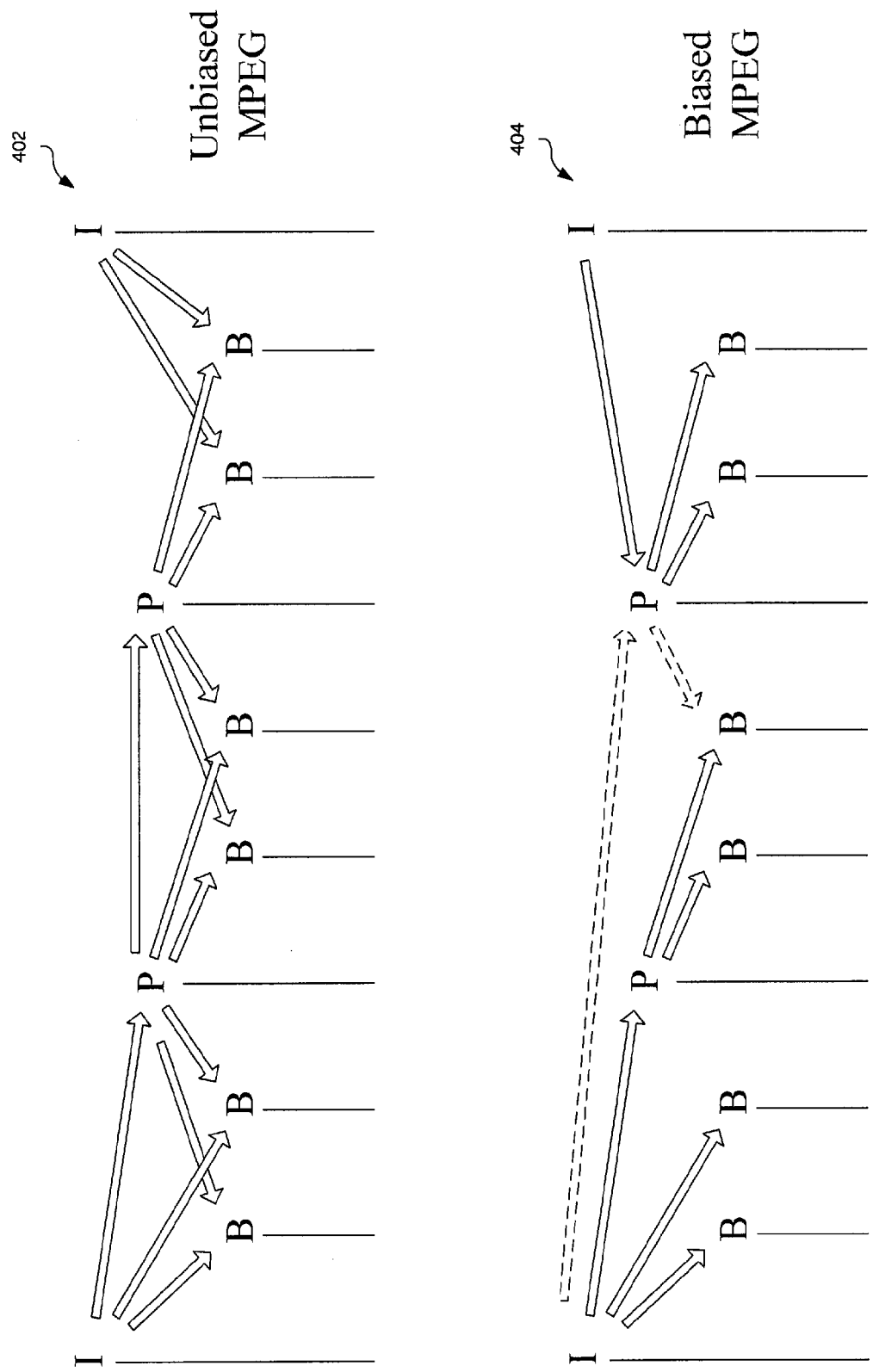
FIG. 4 is a block diagram illustrating exemplary referencing of video frames within a sequence of video frames comprising I frames, P frames and B frames, in accordance with an embodiment of the invention.

FIG. 4 is a block diagram illustrating exemplary referencing of video frames within a sequence of video frames comprising I frames, P frames and B frames, in accordance with an embodiment of the invention. Referring to FIG. 4, there is shown an exemplary sequence of video frames 402 that comprises I frames, B frames and P frames. The sequence of video frames 402 represents an exemplary sequence of video frames that are encoded similarly to MPEGv1(2) however, any other suitable compression standard is modified in accordance with an embodiment of the invention, for example, MPEGv4 Part 10 or H.264. The origin of an arrow shown in the sequence of video frames 402 indicates a reference frame of image data that is utilized along with motion vector data or other image transformation information to estimate the frame pointed to by the arrow. In this regard, the arrow originates at a reference frame and points to a referencing frame. The I frames, B frames and P frames are shown in display order, however; the frames are decoded in order of a reference frame first, a referencing frame next, a re-referencing frame next and so on. In this regard, data for re-constructing a plurality of images is received by a media player prior to decoding the referencing frames that depend on one or more reference frames. The I frames are intra coded video frames. For example, the image data for the I frames is derived from encoded pixel data wherein the pixels span the dimensions of an image or a portion of an image. When the pixel data is decoded, it is utilized to construct the I frame and is also utilized as reference data to construct a P frame and/or a B frame. The P frames are predicted video frames that are generated by utilizing referenced decoded pixel data from another image or frame along with information describing how that image data can be transformed into the P frame. For example, motion vectors, shifts in hue and/or shifts in luminance are applied to a reference frame to generate a P frame. In the sequence of video frames 402, the P frames are shown later in display order than their referenced I frames and some P frames reference prior P frames. The B frames are bi-predictive frames which reference two previously decoded video frames. In addition, the B frames are re-referencing frames wherein a B frame references a frame that references another frame. For example, a B frame may reference a P frame which references an I frame. Referencing helps to improve compression ratios when reduced bandwidth is a primary goal in encoding. In the unbiased sequence of video frames 402, referencing creates dependencies on multiple frames within the sequence of video frames. In instances where an I frame or information for another frame which is depended on by one or more referencing frames is lost or corrupted in transmission between the media sourcing server 307 and the media player 309, a plurality of frames are lost and cannot be effectively reconstructed. This causes a loss of sync and/or a disruption in the perceived video image.

The exemplary sequence of video frames 404 represents results of a method of encoding frames with a bias wherein the number of frames that are depended on to reconstruct an image is reduced to one or two. In instances when image data in an I frame, for example, the last I frame in display order of the sequence of video frames 404, is very different from a prior frame B, a second option for reconstructing the B frame is utilized as is shown by the referencing arrows rendered with a broken line. In addition, the second option is utilized if a referenced P frame is lost in transmission. In various embodiments of the invention, there are fewer P and B frames between I frames to reduce referencing to only one level of dependency. Accordingly, data compressed with the method of biased encoding shown in the sequence of video frames 404 comprise a greater volume of data and a lower compression ratio than the data compressed with the encoding method represented by the sequence of video frames 402; however, the encoding method utilized for the sequence of video frames 404 enables greater reliability in reconstruction of the video frames in the media player 309 and an improved syncing capability.

In operation, the media sourcing server 307 captures multimedia data, for example, the unencoded media data 325 or retrieves stored multimedia data, for example, the encoded media 321. In instances when the unencoded media 325 is utilized, the sourcing server 307 encodes the media with a bias to limit the number of dependencies per video frame. In instances when the encoded media 321 is utilized, the media is decoded by the transcoder 323 and subsequently encoded with a bias to limit the number of frame dependencies. In this regard, the encoded media output from the transcoder 323 may or may not be compliant with the same standard as the encoded media 321. The source encoded media 329 is output from the transcoder 323 and/or the encoder 327. The source encoded media 329 is time stamped to generate the time stamped non-referencing frame data 329*a*, the time stamped referencing frame data 329*b* and the time stamped audio data 329*c*. The time stamped data is sent to the protocol stack paths 337 wherein the sorted and time stamped video frames 329*a* and 329*b* are packetized and sent via the stack pathway supporting more robust packet deliver 337*a* and/or the stack pathway supporting less robust packet delivery 337*b* respectively. The packetized source encoded media 329 is sent to the single PHY 343 via a dual pathway or via one integrated pathway. The PHY 343 physically transmits the packetized time stamped source encoded media 329 to the single PHY 345 in the media player 309. The PHY 345 sends the packetized source encoded non-referencing frames 329*a* to the more robust pathway 347*a* and the packetized source encoded referencing frames 329*b* to the less robust pathway 347*b*. The protocol stack paths 347 send the source encoded media 329 to the dual or integrated pathway queue 349. The video image restoration and audio sync 355 and stitching and lost frame processing 353 in the queue management 351 module compensate for lost or damaged video frames, for example, utilizing frame discard, frame repeat and/or missing frame interpolation and reassemble and/or assembling frames in display order. The time stamped source encoded frames and estimated frames are synced with the time stamped audio and sent to the decoder 357. The unencoded media 359 is consumed by the media player 309. In various embodiments of the invention, the unencoded media 359 is encoded to a higher level of compression for subsequent storage for example.

Figure 5:
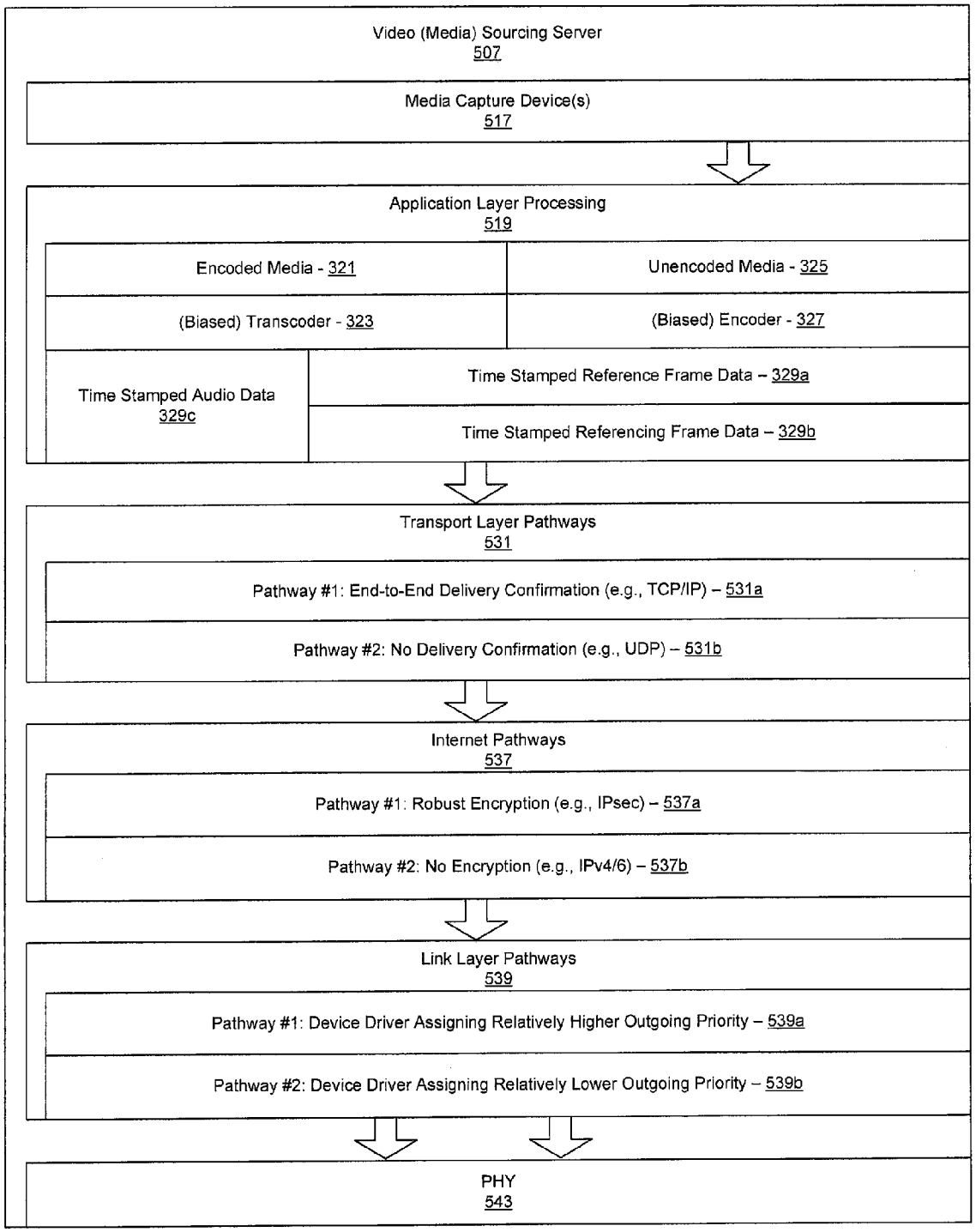
FIG. 5 is a block diagram illustrating an exemplary media sourcing server operable to selectively process and deliver multimedia data via multiple paths, in accordance with an embodiment of the invention.

FIG. 5 is a block diagram illustrating an exemplary media sourcing server operable to selectively process and deliver multimedia data via multiple paths, in accordance with an embodiment of the invention. Referring to FIG. 5, there is shown a media sourcing server 507, media capture device 517, application layer processing 519, optional encoded media 351, optional biased transcoder 323, unencoded media 325, biased encoder 327, time stamped non-referencing frame data 329*a*, time stamped referencing frame data 329*b*, time stamped audio data 329*c*, transport layer paths 531, transport pathway-one 531*a*, transport pathway-two 531*b*, Internet paths 537, IP pathway-one 537*a*, IP pathway-two 537*b*, link layer paths 539, link pathway-one 539*a*, link pathway-two 539*b* and PHY 543.

The media sourcing server 507 is similar or substantially the same as the media sourcing server 307 described with respect to FIG. 3.

The media capture device 517 comprises any suitable device capable of capturing multimedia data for example, a video camera and microphone, a cellular phone or a laptop with camera and/or microphone for example. In various embodiments of the invention, a storage device comprises multimedia data that is distributed by the video sourcing server 307.

The application layer 519 comprises suitable logic, circuitry or code that is operable to encode video frames with a bias and to parse and sort the encoded video frames according to the number of frames each depends on. The optional encoded media 321, optional biased transcoder 323, unencoded media 325, biased encoder 327, time stamped non-referencing frame data 329a, time stamped referencing frame data 329b, time stamped audio data 329c are similar or substantially the same as the respective numbered items described with respect to FIG. 3. In this regard, the optional encoded media 321 optional biased transcoder 323 are utilized in various embodiments that distribute multimedia data retrieved from a storage device for example.

The transport layer paths 531 comprise suitable logic, circuitry and/or code that are operable to implement transport layer services to the encoded media data that is output from the application layer 519. In this regard, the transport layer paths 531 comprise dual paths that offer varying levels of reliability. For example, the more robust transport pathway-one 531a, encapsulates the time stamped non-referencing frame data 329a according to TCP/IP protocols. In this manner, the frame data that is most critical to robust frame reconstruction and the syncing of audio and video data on the media player 309 is delivered in the most reliable manner. Although the TCP/IP delivery is slower than other transport layer methods, the TCP/IP delivery of packets is guaranteed and the packets are delivered in order. Furthermore, the less reliable but faster transport pathway-two 531b encapsulates the time stamped referencing data 329b according to UDP protocols. In this manner, the less robust transport pathway-two 531b handles the frame data that is less critical to robust frame reconstruction and syncing on the media player 309. For example, missing referencing frames can be compensated for when reconstructing video frames and syncing audio on the media player 309. For example, the stitching and lost frame processing 353 and video image restoration and audio sync 355 modules in the media player 309 can more easily recover from lost or damaged referencing frames 329b than from frames that are referenced by them and are lost.

The Internet paths 537 comprise suitable logic, circuitry and/or code that are operable to implement Internet protocols with varying levels of security. For example, the time stamped non-referencing frame data 329a that is output from the TCP/IP transport pathway-1 531a is encrypted for a higher level of security by the IP pathway-1 537a. In this regard, IPsec is utilized to encrypt and/or authenticate each packet delivered via the IP pathway-1 537a. In this manner the critical video frames 329a are protected from interception by an unauthorized entity. Notwithstanding, the less critical time stamped referencing frame data 329b that is handled by UDP is handled by the IP pathway-2, 537b. The IP pathway-2 537b utilizes IPv4 or IPv6 protocols that do not encrypt the frame data. IPv4 or IPv6 is sufficient for 329b delivery because the referencing frames 329b are useless when restoring video frames without use of the non-referencing frames 329a.

The link layer paths 539 comprise suitable logic, circuitry and/or code that are operable to sort the frame packets according to priority for delivery to the PHY 543 and handle routing in the wired and/or wireless communication network 123. In this regard, the link pathway-1 539a handles the non-referencing frame data packets that are output from the IP pathway-1 537a. The link pathway-2 539b handles the referencing frame data packets output from the IP pathway-2 537b. The link layer paths 539 prioritizes delivery of packets in the queues according to which sequence of video frames a packet belongs to and by whether a packet comprises non-referencing or referencing frames. For example, the non-referencing frames of one sequence of video frames are sent first. Subsequently, the referencing frames of the same sequence of video frames are sent. After all frames from one sequence of video frames are sent, a subsequent sequence of video frames is handled.

In operation, media is captured by the media capture device 517 in the video sourcing server 507 and it is encoded by the encoder 327 with a bias for limiting a number of dependencies on reference frames. The encoded video frames are parsed and sorted according to the number of frames that a target frame depends on. The video and audio frames are time stamped and the video frames with fewer dependencies are assigned a higher priority than frames with a greater number of frames from which they depend. Also, a higher level of external quality of service (QoS) that enables guarantee of packet delivery may be assigned to the higher priority frames. The higher priority frames, for example from the frame data 329a, is sent to the transport pathway-1 531a for TCP/IP transport services and then to the IP pathway-1 537a for encryption and then to a queue in the link pathway-1 539a. In addition, the lower priority frames, for example, from the frame data 329b, is sent to the transport pathway-2 531b for UDP transport services, then to the IP pathway-2 537b and then to a queue in the link pathway-2 539b. The PHY 543 delivers all of the packets comprising frames from a first sequence of video frames before all of the packets from a second sequence of video frames. In addition, the PHY 543 delivers the packets within a sequence of video frames comprising higher priority frame data before delivering packets within the same sequence of video frames comprising lower priority frame data.

Figure 6:
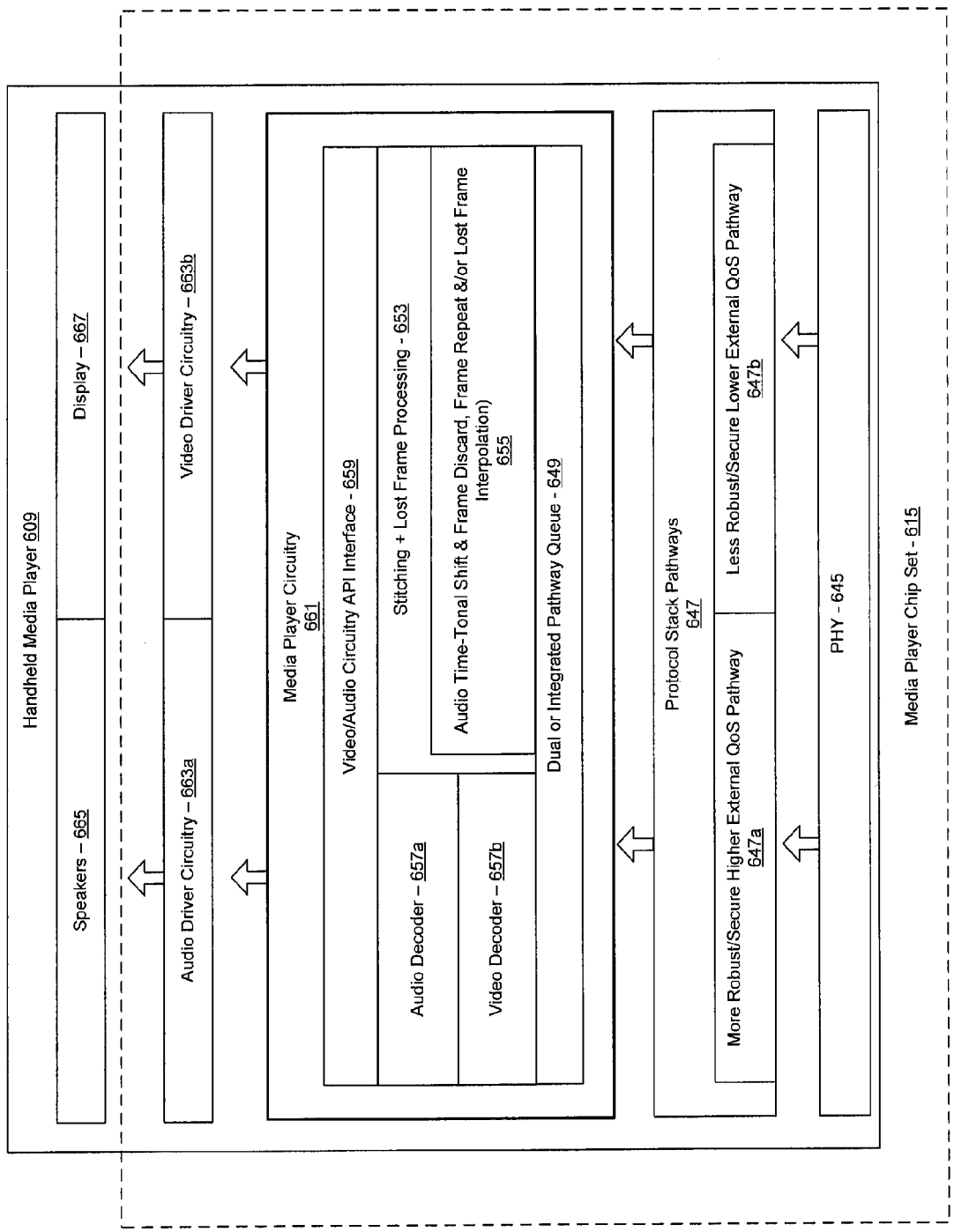
FIG. 6 is a block diagram illustrating an exemplary handheld media player comprising a media player chipset, in accordance with an embodiment of the invention.

FIG. 6 is a block diagram illustrating an exemplary handheld media player comprising a media player chipset, in accordance with an embodiment of the invention. Referring to FIG. 6, there is shown, handheld media player 609, a media player chipset 615, PHY 645, protocol stack paths 647, a more robust pathway 647a, a less robust pathway 647b, dual or integrated pathway queue 649, stitching and lost frame processing 653, video image restoration and audio sync 655, audio decoder 657a, video decoder 657b, media player circuitry 661, video and/or audio circuitry API interface 659, audio driver circuitry 663a, video driver circuitry 663b, speakers 665 and video display 667.

The media player 609 comprises suitable logic, circuitry and/or code that are operable to receive, store, and/or render multimedia data that is communicated to the media player 609 from a remote source via diverse communication protocol paths, for example, the sourcing server 307 described with respect to FIG. 3. In addition, the media player 609 is operable to retrieve, store and/or render multimedia data from a storage device, for example, a DVD or Blu-ray disc. The media player 609 comprises functionality that is similar to or substantially the same as the media player 309 described with respect to FIG. 3. Notwithstanding, the media player 609 implements the media player functionality with the media player chipset 615. The media player chipset 615 comprises one or more chips. For example, the media player chipset 615 comprises one or more special purpose processors such as a digital signal processor (DSP) to implement media player functionality. In this regard, the media player chipset 615 comprises one or more of the PHY 645, protocol stack paths 647, more robust pathway 647a, less robust pathway 647b, dual or integrated pathway queue 649, stitching and lost frame processing 653, video image restoration and audio sync 655, audio decoder 657a, video decoder 657b, media player circuitry 661, video and/or audio circuitry API interface 659, audio driver circuitry 663a, video driver circuitry 663b. The media player chipset 615 is operable to receive and process multimedia packet data that is packetized via a plurality protocol stack paths based on an assigned priority. The media player 609 is operable to communicate with a sourcing server such as the sourcing server 307 via one or more wireless, optical and/or wired communication networks, for example, the communication backbone 123, the IP network 125, the wireless network 127, the PSTN 129, the wireless base station 121 and/or a Bluetooth connection described with respect to FIG. 1. Various embodiments of the media player 309 are operable to capture media and/or encode multimedia data.

The physical interface (PHY) 645 comprises suitable logic, circuitry and/or code that is operable to physically receive packets comprising encoded media from, for example, the PHY 343 via communication backbone 123, the IP network 125, the wireless network 127, the PSTN 129, the wireless base station 121 and/or a Bluetooth connection. For example, the PHY 645 receives the source encoded media 329 that is prioritized and/or sorted based on the number of reference frames that a video frame depends on and delivered via diverse protocol paths as described with respect to FIG. 3.

The protocol stack paths 647 comprise suitable logic, circuitry and/or code that are operable to receive the packets comprising the source encoded media 329 via the more robust pathway 647a and/or the less robust pathway 647b from the single PHY 645. The protocol stack paths remove the encapsulation of the link layer, transport layer and/or Internet protocols. In addition, the protocol stack pathway 647 delivers the source encoded media to the dual or integrated pathway queue 649.

The media player circuitry 661 comprises suitable logic, circuitry and/or code that are operable to implement media player functionality. The media player circuitry 661 comprises the dual or integrated pathway queue 649, the stitching and lost frame processing 653, the video image restoration and audio sync 655, the audio decoder 657a and the video decoder 657b. The media player circuitry receives the source encoded media 329 from the protocol stack paths 647a and/or 647b, processes the media and forwards decoded media to the audio driver 663a and video driver 663b.

The video restoration and audio sync 655 module comprises suitable logic, circuitry and/or code that is operable to receive the source encoded media 329 frames from the dual or integrated pathway queue 649, restore images in the video frames and synchronize the audio and video frames. The video restoration and audio sync module 655 compensates for missing video frames in various ways. In an exemplary embodiment of the invention, the video restoration and audio sync 655 module is operable to repeat a frame if a prior or a subsequent frame is missing. In this manner, the audio data stays in sync with corresponding video images. In instances when up to a specified number of frames are missing, the missing frames are replaced with interpolated frames and the audio data are synchronized with the interpolated frames. In other instances when more than the specified number of frames are missing, the frames are discarded and the audio play back rate is increased up to catch up over some number of video frames to achieve synchronous audio and video images. In this regard, the increased audio rate causes a temporary tonal shift until the video and audio synchronization is achieved. The specified number of frames is programmable and may be adjusted statically or dynamically. In addition, the stitching and lost frame processing 653 receives the restored and synchronized frames and reassembles them into a proper sequence according to their time stamps. The reassembled frames comprising the source encoded media 329 are forwarded to the audio decoder 657a and the video decoder 657b.

The audio decoder 657a and the video decoder 657b comprise suitable logic, circuitry and/or code that are operable to decode the audio and the biased video frames and forward the decoded audio and video frames to the audio driver circuitry 663a and video driver circuitry 663b respectively. In various embodiments of the invention, decoded audio and video frames are encoded without a bias for storage on the media player 309. In this regard removal of the biasing improves a compression ratio for more compact storage.

The and audio driver circuitry 663a, video driver circuitry 663b comprise suitable logic, circuitry and/or code that are operable to physically send the decoded audio and decoded video frames to the speakers 665 and display 667 respectively. In this regard, the video and/or audio circuitry API interface 659 comprises a set of functions that are called to control the audio driver circuitry 663a and/or video driver circuitry 663b.

In operation, the handheld media player 609 receives packets of encoded multimedia data wherein encoded video frames are prioritized and/or selectively treated via a plurality of protocol stack paths, according to the number of frame dependencies per video frame. The encoded multimedia data is received from a remote server or a from a storage medium, for example, a CD, DVD or Blu-ray disc. In this regard, the PHY 645 receives the encoded multimedia data, for example, the packetized and bias encoded media 329 via a dual pathway. The PHY 645 sends the received packetized source encoded non-referencing frames 329a to the more robust pathway 647a and the packetized source encoded referencing frames 329b to the less robust pathway 647b. The protocol stack paths 647 send the source encoded media 329 to the dual or integrated pathway queue 649. The video image restoration and audio sync 655 and stitching and lost frame processing 653 compensate for lost or damaged video frames, for example, utilizing frame discard, frame repeat and/or missing frame interpolation and assembling frames into display order. The time stamped source encoded frames and estimated frames are synced with the time stamped audio. The audio data is sent to the audio decoder 657a and the video frames are sent to the video decoder 657B wherein unencoded audio and/or video data are generated. The unencoded audio and/or video data is sent by the audio driver 663a, video driver 663b and the audio/video circuitry API interface 659 to the speakers 665 and/or the display 667 for consumption. In various embodiments of the invention, the unencoded audio and/or video data are encoded to a higher level of compression for subsequent storage for example.

Figure 7:
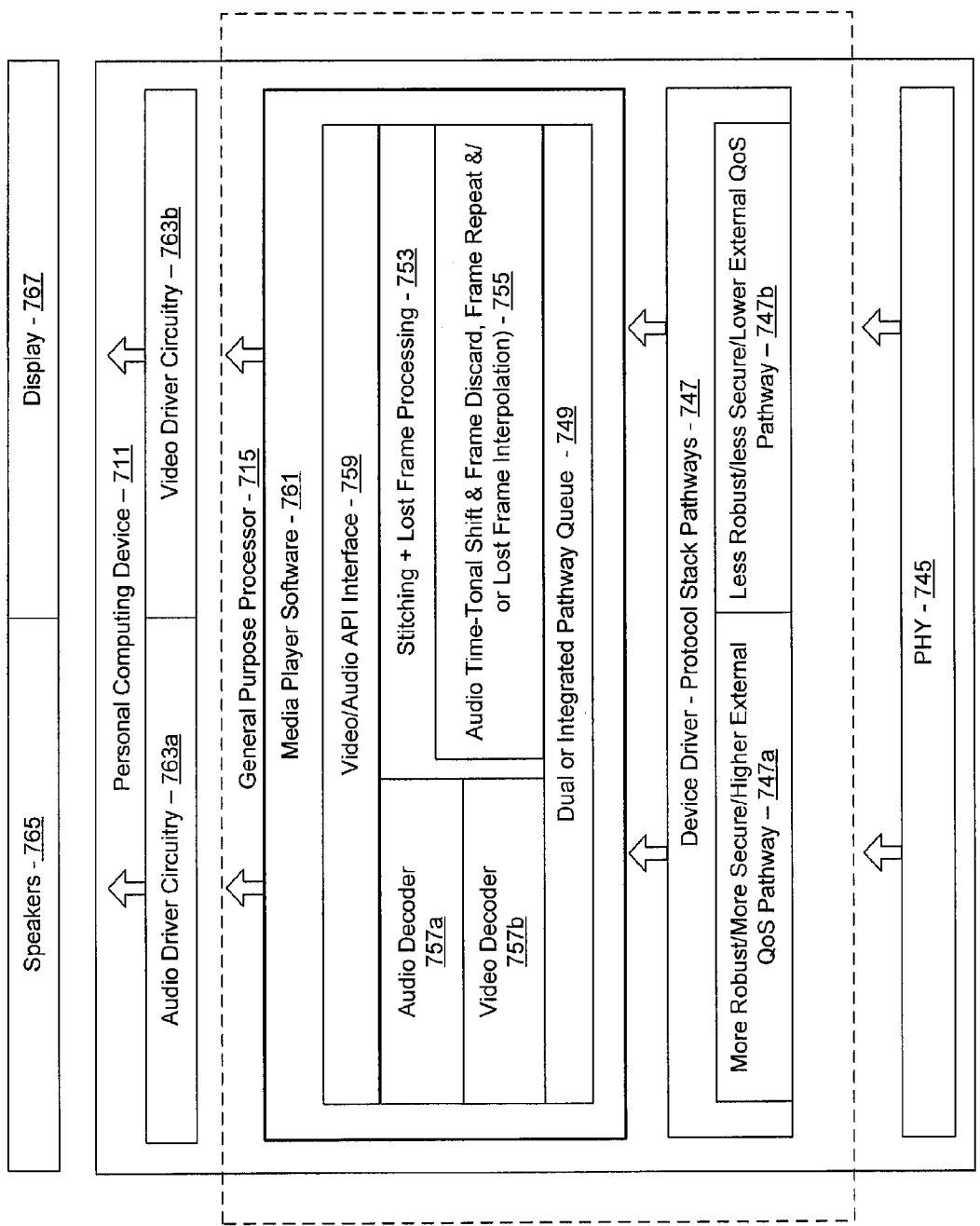
FIG. 7 is a block diagram illustrating an exemplary computing device comprising a media player implemented with software, in accordance with an embodiment of the invention.

FIG. 7 is a block diagram illustrating an exemplary computing device comprising a media player implemented with software, in accordance with an embodiment of the invention. Referring to FIG. 7, there is shown a personal computing device 711, a PHY 745, a general purpose processor 715, protocol stack paths 747, a more robust pathway 747a, a less robust pathway 747b, dual or integrated pathway queue 749, stitching and lost frame processing software 753, video image restoration and audio sync software 755, audio decoder software 657a, video decoder software 757b, media player software 761, video and/or audio circuitry API interface 759, audio driver circuitry 763a, video driver circuitry 763b, speakers 735 and video display 737.

The personal computing device 711 comprises suitable logic, circuitry and/or code that are operable to receive, store, and/or render multimedia data. The multimedia data is received by the personal computing device 711 from a remote source via diverse communication protocol paths, for example, from the sourcing server 307 described with respect to FIG. 3. In addition, the personal computing device 711 is operable to retrieve, store and/or render multimedia data from a storage device, for example, a DVD or Blu-ray disc. The personal computing device 711 comprises functionality that is similar to or substantially the same as the media player 309 described with respect to FIG. 3. In this regard, the personal computing device 711 implements the media player functionality on the general purpose processor 715 with media player software 761 and device driver protocol stack paths 747. Although the media player shown in FIG. 6 is implemented utilizing the chipset 615 and the media player shown in FIG. 7 is implemented utilizing media player software on a general purpose processor 715, the invention is not so limited. In this regard, any combination of suitable hardware, software and/or firmware are utilized to implement an embodiment of the invention according to various design choices.

The general purpose processor 715 comprises suitable logic, circuitry and/or code to receive packetized audio data and/or video frame data from the PHY 745, to process the received data and deliver unencoded audio to the speakers 735 via the audio driver circuitry 763a and unencoded video frames to the display 737 via the video driver circuitry 763b. In this regard, software running on the general purpose processor 715 comprise one or more of the protocol stack paths 747, more robust pathway 747a, less robust pathway 747b, dual or integrated pathway queue 749, the media player software 761 comprising stitching and lost frame processing software 753, video image restoration and audio sync software 755, audio decoder software 757a, video decoder software 757b, video and/or audio API interface 759. In addition, the general purpose processor 715 hosts audio driver circuitry 763 and video driver circuitry 763. Furthermore, the PHY 745, general purpose processor 715, device driver protocol stack paths 747 and media player software 761 are operable to receive and process multimedia packet data that is delivered via a plurality methods based on an assigned priority. In this regard, the personal computing device 711 is operable to communicate with a media sourcing server such as the sourcing server 307 via one or more wireless, optical and/or wired communication networks, for example, the communication backbone 123, the IP network 125, the wireless network 127, the PSTN 129 and the wireless base station 121 described with respect to FIG. 1. Various embodiments of the invention may also be operable to capture media and/or encode multimedia data.

The physical interface (PHY) 745 is a PHY interface that comprises suitable logic, circuitry and/or code that is operable to physically receive packets comprising encoded media from, for example, the PHY 343 via the communication backbone 123, the IP network 125, the wireless network 127, the PSTN 129, the wireless base station 121 and/or a Bluetooth connection. In this regard, the PHY 745 receives the source encoded media 329 described with respect to FIG. 3, that is sorted and delivered via diverse protocol paths based on the number of frames a target frame depends.

The protocol stack paths 747 comprise suitable logic, circuitry and/or code that are operable to receive packets comprising the source encoded media 329 via the more robust pathway 647a and/or the less robust pathway 647b from the single PHY 745. The protocol stack paths remove the encapsulation of the link layer, transport layer and/or Internet protocols. In addition, the protocol stack pathway 747 delivers the source encoded media to the dual or integrated pathway queue 749.

The media player software 761 is operable to implement media player functionality. The media player software 761 comprises the dual or integrated pathway queue 749, stitching and lost frame processing software 753, video image restoration and audio sync software 755, audio decoder software 757a, video decoder software 757b. The media player software 761 receives the source encoded media 329 from the protocol stack paths 747a and 747b processes the media and forwards decoded media to the audio driver 763a and video driver 663b.

The video restoration and audio sync software 755 is operable to receive the source encoded media 329 frames from the dual or integrated pathway queue 749 and to restore images in the video frames and synchronize the audio and video frames. The video restoration and audio sync software 755 compensates for missing video frames in various ways. In an exemplary embodiment of the invention, the video restoration and audio sync software 755 repeats a frame if a prior or a subsequent frame is missing. In this manner, the audio stays in sync with the video images. In instances when up to a specified number of frames are missing, the missing frames are replaced with interpolated frames and the audio stays in sync with the interpolated frames. In other instances when more than the specified number of frames are missing, the frames are discarded and the audio play back rate is increased to catch up over some number of frames to the video frames to achieve synchronous audio and video images. The specified number of frames is programmable and may be statically or dynamically changes. In this regard, the increased audio rate causes a temporary tonal shift until the video and audio sync is achieved. In addition, the stitching and lost frame processing software 753 receives the restored and synced frames and reassembles them into a proper sequence according to the time stamps. The reassembled frames and corresponding audio comprising the source encoded media 329 are forwarded to the audio decoder software 657a and the video decoder software 657b.

The audio decoder software 757a and the video decoder software 757b is operable to decode the received audio and the biased video frames and forward the decoded audio and video frames to the audio driver circuitry 763a and video driver circuitry 763b respectively. In various embodiments of the invention, decoded audio and video frames are encoded without a bias for storage on the personal computing device 711 or other storage devices. In this regard the removal of the biasing improves a compression ratio for more compact storage. In alternative embodiments of the invention, the audio decoder 757a and video decoder 757b are implemented in hardware for example.

The audio driver circuitry 763a and video driver circuitry 763b comprise suitable logic, circuitry and/or code that are operable to physically send the decoded audio and decoded video frames to the speakers 765 and display 767 respectively. In this regard, the video and/or audio API interface 759 comprises a set of functions that are called to control the audio driver circuitry 763a and/or video driver circuitry 763b.

In operation, the personal computing device 711 receives packets of encoded multimedia data wherein encoded video frames are prioritized and/or selectively treated via a plurality of protocol paths, according to the number of frame dependencies per video frame. The encoded multimedia data may have been received from a remote server or a from a storage medium, for example, a CD, DVD or Blu-ray disc. In this regard, the single PHY 745 receives the encoded multimedia data, for example, the encoded media 329 that is packetized via a dual pathway. The PHY 745 sends the received packetized source encoded non-referencing frames 329*a* to the more robust pathway 747*a* and the packetized source encoded referencing frames 329*b* to the less robust pathway 747*b*. The protocol stack paths 747 send the source encoded media 329 to the dual or integrated pathway queue 749. The video image restoration and audio sync 755 software and the stitching and lost frame processing 753 software compensate for lost or damaged video frames, for example, utilizing frame discard, frame repeat and/or missing frame interpolation and assembling frames into display order. The resulting time stamped, source encoded video frames 329*a* and/or 329*b* and the estimated video frames are synced with the time stamped audio 329*c*. The audio data 329*c* is sent to the audio decoder 757*a* and the corresponding video frames are sent to the video decoder 757B that generate unencoded audio and/or video data. The unencoded audio and/or video data is sent to the speakers 765 and/or the display 767 for consumption via the audio driver 763*a*, video driver 763*b* and the audio/video circuitry API interface 759. In various embodiments of the invention, the unencoded audio and/or video data is encoded to a higher level of compression for subsequent storage for example.

Figure 8:
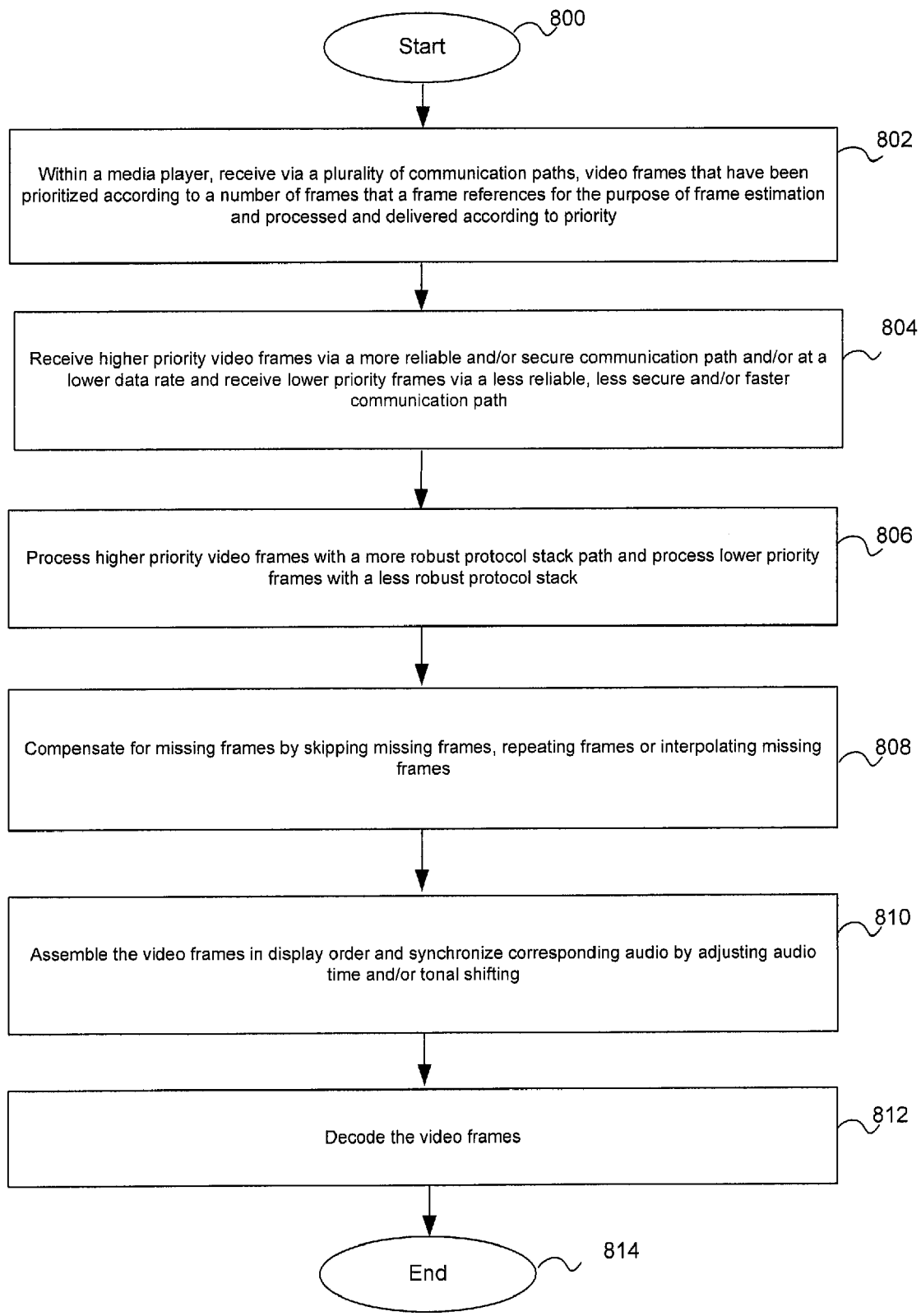
FIG. 8 is a flow chart illustrating exemplary steps for receiving and processing multimedia data based on selective treatment of multimedia data, in accordance with an embodiment of the invention.

FIG. 8 is a flow chart illustrating exemplary steps for receiving and processing multimedia data based on selective treatment of multimedia data, in accordance with an embodiment of the invention. Step 800 is a start step. In step 802, within the media player 109, video frames are received via a plurality of communication paths, and these video frames were prioritized according to a number of frames that a frame references for the purpose of frame estimation and processed and delivered according to priority. In step 804, higher priority video frames are received via a more reliable and/or secure communication path and/or at a lower data rate and receive lower priority frames via a less reliable, less secure and/or faster communication path. For example, higher priority frames are sent utilizing IP sec and TCP/IP. Lower priority frames are sent via IPv4 and/or IPv6 and UDP. In step 806, process higher priority video frames with a more robust protocol stack path and process lower priority frames with a less robust protocol stack. For example, higher priority frames are sent utilizing IP sec and TCP/IP. Lower priority frames are sent via IPv4 and/or IPv6 and UDP. In step 808, compensation is provided for missing frames by skipping missing frames, repeating frames or interpolating missing frames. In step 810, the video frames are assembled in display order and synchronize video frames with corresponding audio by adjusting corresponding audio for estimated frames and/or tonal shifting. In step 812, the video frames are decoded. Step 814 is an end of exemplary steps.

In an embodiment of the invention, a media player 609 receives a sequence of video frames and corresponding audio content from a media source 307. The media player 609 is operable to process a first portion of the received sequence of video frames via a first protocol stack 647*a* and a second portion of the received sequence of video frames via a second protocol stack 647*b*. The media player 609 is operable to generate a local sequence of video frames from the processed first portion of the received sequence of video frames and the processed second portion of the received sequence of video frames. The first portion of the received sequence of video frames is received via a first communication path with a lower data rate. The second portion of the received sequence of video frames is received via a second communication path at a higher data rate. In various embodiments of the invention, the first portion of the received sequence of video frames comprises video frames with fewer frame reference dependencies than the second portion of the received sequence of video frames. In this regard, the media source 307 is operable to limit the number of allowed dependencies per frame when encoding video frames in the sequence of video frames. The first portion of the received sequence of video frames that comprise fewer frame reference dependencies are received in the media player 609 with a higher level of security and are treated with a more robust process than the second portion of the sequence of video frames with a greater number of frame reference dependencies.

In various embodiments of the invention, the media player 609 stores video frame data from the first portion and the second portion of the received sequence of video frames in separate pathway queues 649. In other embodiments of the invention, the media player stores the frame data from the first and second portions of the received sequence of video frames in a single pathway queue 649. Video frame data from the first portion of the received sequence of video frames is utilized to compensate for lost video frames by generating repeated video frames and/or interpolated video frames. The media player 609 comprising the stitching and lost frame processing 653, video image restoration and audio sync 655, constructs the local sequence of video frames, for example that comprise the received video frames, repeated video frames and/or interpolated video frames. The media player 609 synchronizes and/or audio shifts the audio content and the generated local sequence of video frames. Furthermore, the media player 609 comprising the audio decoder 657*a* and video decoder 657*b*, decodes the local sequence of video frames and the corresponding audio content.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for constructing video frames and synchronizing audio data in a media player from data received via a plurality of diverse protocol stack paths.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving in a media player, a sequence of video frames and corresponding audio content from a media source, at least some frames of the sequence of video frames are dependent on other frames of the sequence and wherein frame dependencies for video frames within the sequence of video frames are limited to a predetermined number of frames that respective frames reference when encoding the video frames within the sequence of video frames, and wherein respective video frames of the sequence of video frames have been assigned a priority according to the number of frames that a respective video frame references for a purpose of frame estimation, a first portion of said sequence of video frames including higher priority frames comprising relatively fewer reference frame dependencies, a second portion of said sequence of video frames including lower priority frames comprising relatively more reference frame dependencies;
processing the first portion of said sequence of video frames via a first protocol stack and the second portion of said sequence of video frames via a second protocol stack;
applying a more robust processing to said first portion of said sequence of video frames than to said second portion of said sequence of video frames in said media player; and
generating a local sequence of video frames from said processed first portion of said sequence of video frames and said second portion of said sequence of video frames.

2. The method according to claim 1, comprising receiving said first portion of said sequence of video frames with a greater level of security than said second portion of said sequence of video frames.

3. The method according to claim 1, comprising storing said second portion of said sequence of video frames and said first portion of said sequence of video frames in separate queues in said media player.

4. The method according to claim 1, comprising storing said second portion of said sequence of video frames and said first portion of said sequence of video frames in a single queue in said media player.

5. The method according to claim 1, comprising generating repeated and/or interpolated video frames based on said received first portion of said sequence of video frames to compensate for loss of ones of said second portion of said sequence of video frames.

6. The method according to claim 5, comprising synchronizing said corresponding audio content utilizing said generating repeated video frames and/or interpolated video frames.

7. The method according to claim 5, comprising assembling said repeated video frames, said interpolated video frames and/or said received sequence of video frames into display order.

8. The method according to claim 5, comprising decoding said repeated video frames, said interpolated video frames and/or said received sequence of video frames.

9. The method according to claim 1, comprising synchronizing said generated local sequence of video frames with said corresponding audio content.

10. The method according to claim 1, comprising tone shifting said corresponding audio content.

11. The method according to claim 1, comprising receiving said second portion of said of said sequence of video frames at a higher data rate than said first portion of said sequence of video frames.

12. The method according to claim 1, wherein said first portion of said sequence of video frames comprises video frames with fewer frame reference dependencies than said second portion of said sequence of video frames.

13. A system for communication, the system comprising:
one or more circuits for use in a media player, wherein said one or more circuits are operable to receive a sequence of video frames and corresponding audio content from a media source, wherein frame dependencies for video frames within the sequence of video frames are limited to a predetermined number of frames that respective frames reference when encoding the video frames within the sequence of video frames, respective video frames of the sequence of video frames having been prioritized according to a number of frames that a respective video frame references for a purpose of frame estimation, a first portion of said sequence of video frames including higher priority frames comprising relatively fewer reference frame dependencies, a second portion of said sequence of video frames including lower priority frames comprising relatively more reference frame dependencies;
said one or more circuits are operable to process the first portion of said sequence of video frames via a first protocol stack and the second portion of said sequence of video frames via a second protocol stack;
said one or more circuits are operable to apply a more robust processing to said first portion of said sequence of video frames than to said second portion of said sequence of video frames in said media player; and
said one or more circuits are operable to generate a local sequence of video frames from said processed first portion of said sequence of video frames and said second portion of said sequence of video frames.

14. The system according to claim 13, wherein said one or more circuits are operable to receive said first portion of said sequence of video frames with a greater level of security than said second portion of said sequence of video frames.

15. The system according to claim 13, wherein said one or more circuits are operable to store said second portion of said sequence of video frames and said first portion of said sequence of video frames in separate queues in said media player.

16. The system according to claim 13, wherein said one or more circuits are operable to store said second portion of said sequence of video frames and said first portion of said sequence of video frames in a single queue in said media player.

17. The system according to claim 13, wherein said one or more circuits are operable to generate repeated and/or interpolated video frames based on received said first portion of said sequence of video frames to compensate for loss of ones of said second portion of said sequence of video frames.

18. The system according to claim 17, wherein said one or more circuits are operable to synchronize said corresponding audio content utilizing said generating repeated video frames and/or interpolated video frames.

19. The system according to claim 17, wherein said one or more circuits are operable to assemble said repeated video frames, said interpolated video frames and/or said received sequence of video frames into display order.

20. The system according to claim 17, wherein said one or more circuits are operable to decode said repeated video frames, said interpolated video frames and/or said received sequence of video frames.

21. The system according to claim 13, wherein said one or more circuits are operable to synchronizing said generated local sequence of video frames with said corresponding audio content.

22. The system according to claim 13, wherein said one or more circuits are operable to tone shift said corresponding audio content.

23. The system according to claim 13, wherein said one or more circuits are operable to receive said second portion of said of said sequence of video frames at a higher data rate than said first portion of said sequence of video frames.

24. The system according to claim 13, wherein said first portion of said sequence of video frames comprises video frames with fewer frame reference dependencies than said second portion of said sequence of video frames.

25. The method according to claim 1, wherein frame dependencies for video frames within the sequence of video frames are limited to no more than zero frames or one frame that respective frames reference when encoding the video frames within the sequence of video frames.

26. The system according to claim 13, wherein frame dependencies for video frames within the sequence of video frames are limited to no more than zero frames or one frame that respective frames reference when encoding the video frames within the sequence of video frames.

* * * * *